Nov. 23, 1937.    E. P. TRAVIS    2,100,113
GREASE RETAINER
Filed Feb. 3, 1933    2 Sheets—Sheet 1
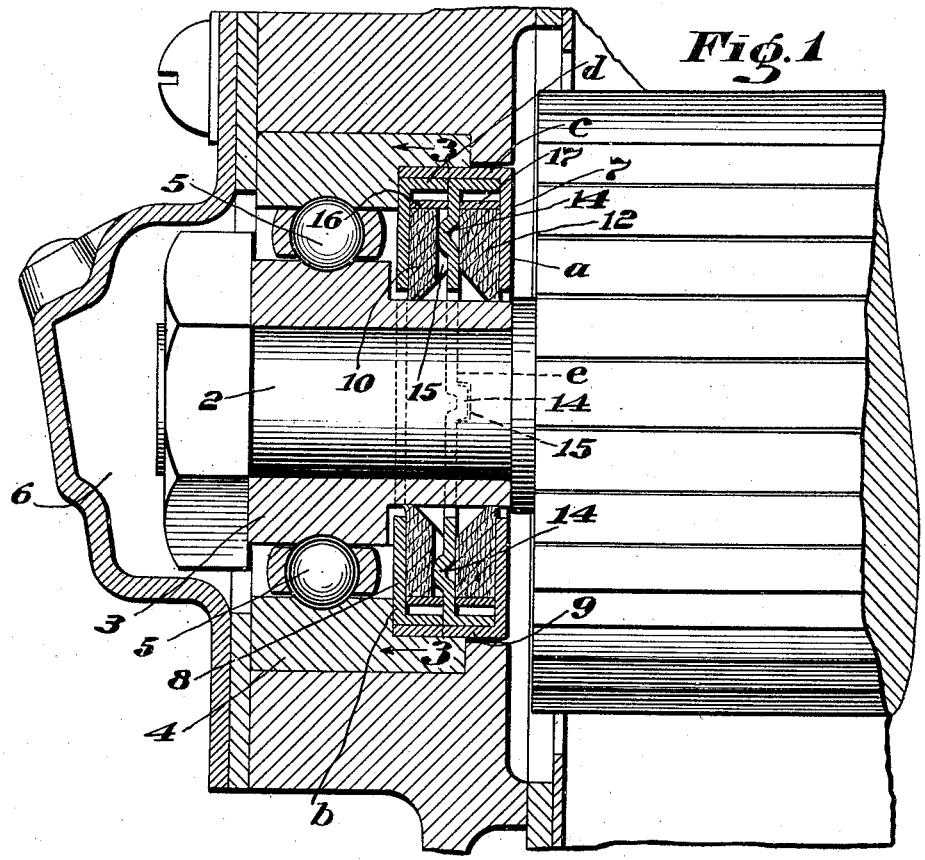
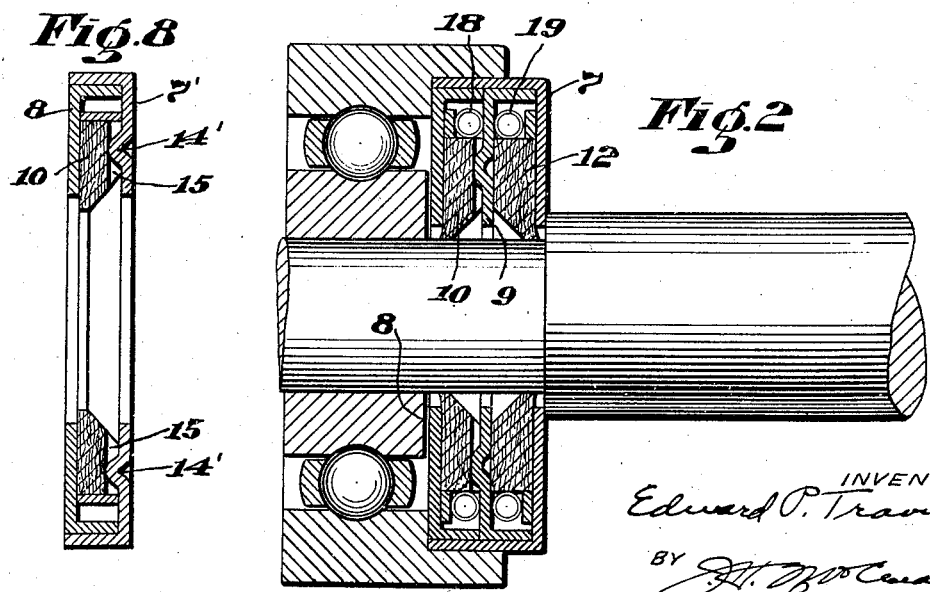
INVENTOR:
Edward P. Travis,
BY [signature]
his ATTORNEY.

Nov. 23, 1937. E. P. TRAVIS 2,100,113
GREASE RETAINER
Filed Feb. 3, 1933 2 Sheets—Sheet 2
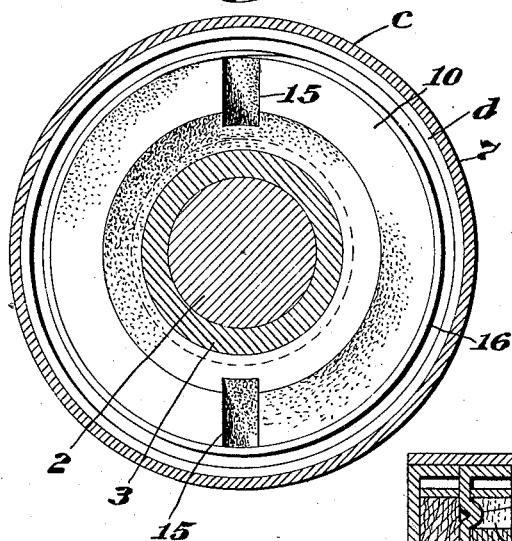
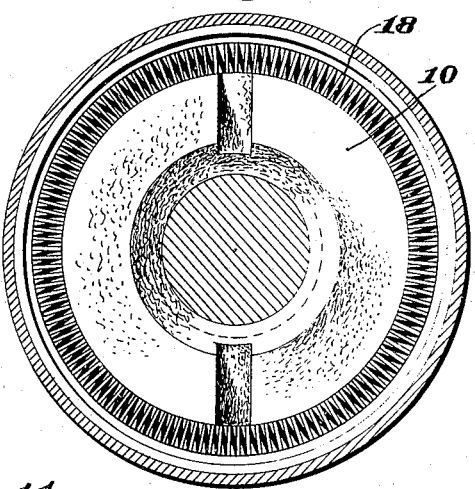
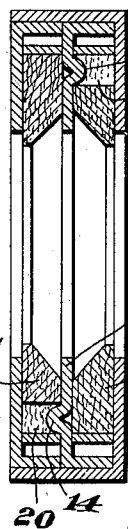
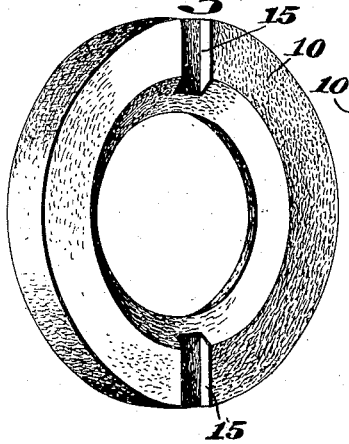
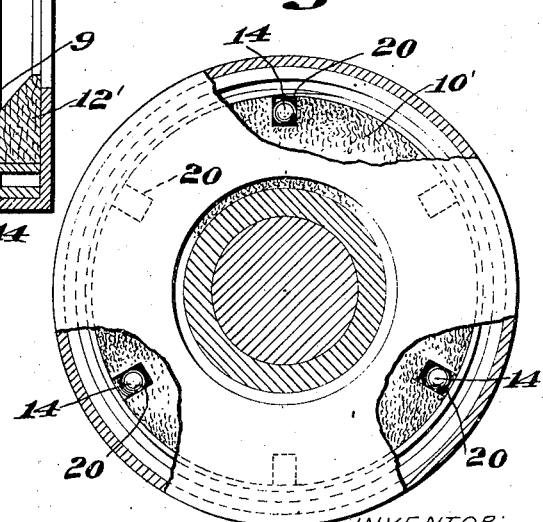
INVENTOR:
Edward P. Travis,
BY his ATTORNEY.

Patented Nov. 23, 1937

2,100,113

UNITED STATES PATENT OFFICE 2,100,113

GREASE RETAINER

Edward P. Travis, Floral Park, N. Y., assignor, by mesne assignments, to Chicago Rawhide Manufacturing Company, Chicago, Ill., a corporation of Illinois Application February 3, 1933, Serial No. 655,039

1 Claim. (Cl. 288—1)

This invention relates to grease retainers of the general type used in connection with ball bearings, roller bearings, and other bearing surfaces.

It aims to devise an article of this character which will be exceptionally efficient in operation, and which can be manufactured economically.

The nature of the invention will be readily understood from the following description when read in connection with the accompanying drawings, and the novel features will be particularly pointed out in the appended claim.

In the drawings,

Figure 1 is a vertical, sectional view of a bearing structure equipped with a grease retainer embodying this invention;

Fig. 2 is a view similar to Fig. 1 showing a somewhat different application of the invention;

Fig. 3 is a vertical section on the line 3—3, Fig. 1;

Fig. 4 is a sectional view corresponding to Fig. 3 of the device shown in Fig. 2;

Fig. 5 is a perspective view of the fibrous washer used in the devices shown in Figs. 3 and 4;

Fig. 6 is an end view, partly in section, of another embodiment of the invention;

Fig. 7 is a vertical, sectional view of a grease retainer of the double type embodying this invention; and Fig. 8 is a similar view of one of these devices of the single type.

Referring first to Fig. 1, a typical bearing structure for supporting one end of a motor armature is there shown. In this figure the armature shaft is illustrated at 2, an inner ball race at 3, an outer ball race at 4, and certain of the bearing balls at 5—5. As is common in this and many other machines, an oil well 6 is provided at the end of the shaft where it is in free communication with the ball races.

It is desirable to prevent the travel of oil from the ball race to the armature or commutator of the machine, and for this purpose a grease retaining ring is shown in Fig. 1 which is constructed in accordance with this invention. As shown, this ring comprises an annular casing made of sheet metal and consists of a main casing ring 7 with a smaller ring 8 pressed into one end of it and an intermediate ring 9 located between the flanges of the two rings 7 and 8. In other words, both these rings are of angular form in section and are provided with radially extending flanges $a$ and $b$ and with circumferential flanges $c$ and $d$, respectively, the latter fitting snugly within the former and being held frictionally thereto. The intermediate ring 9 has similar flanges but need not have a pressed fit with the ring 7. Located within the casing are two washers 10 and 12, respectively, both made of some fibrous material such, for example, as leather, felt, or the like. Preferably these rings are made of hardened felt. The washer 10 has a flat face to bear against the radial flange $b$ of the casing, while the other washer 12 has a corresponding face to bear against the casing wall $a$. These walls $a$ and $b$ extend inwardly to points closely adjacent to the inner edges of the washers so that they afford firm lateral support for the washers down to points adjacent to the inner edges of the washers. This is important because of the fact that the margins of the washers adjacent to their inner edges are cut away or bevelled at the sides opposite to the casing walls $a$ and $b$, as clearly shown in Fig. 1, and as further illustrated in Figs. 3 and 5, so that the edges of the washers which bear against the inner revolving race 3 are relatively thin. These washers are separated from each other by the radial flange $e$ of the central casing member 9, and said flange preferably has lugs 14 punched up from the material thereof to enter recesses or grooves 15 formed in the respective washers. The shape of these grooves is better shown in Figs. 3 and 5. Contracting leaf springs 16 and 17 encircle and bear on the outer edges or circumferences of the washers 10 and 12, respectively, and tend to contract these washers radially.

It should be observed that the outer radial face of the washer 10 lies in a plane approximately perpendicular to the shaft 2 so that this surface makes an angle of 90° with the surface of the race 3 on which it bears. Usually the extreme edge portion of the washer is slightly spread out by its contact with this surface of the race so that it makes an angle slightly greater than 90° with said surface. I have found that this angular relationship is important in preventing the movement of oil along the surface of the race past the washer. In other words, if the surface of the washer which is in contact with the body of oil, and which is relied upon to hold back this body, makes an angle of approximately 90°, or even a considerably greater angle, it is far more effective than the same construction would be if it made an acute angle with said surface. On the other hand, the inner bevelled surface of the washer 10 operates when oil or other lubricant is brought into contact with it to retain the oil in the form of a meniscus but offers much less resistance to the transfer of oil past the edge in the direction of the bevel than does the opposite face of the washer. In other words, the outer surface of the washer 10 will strongly resist any movement of lubricant along the surface of the rotating race member 3 in a direction from left to right, as the parts appear in Fig. 1. The inner bevelled surface of said washer tends to retain any lubricant which is in contact with it in the form of a meniscus and offers a greater resistance to the movement of the liquid past the washer in a direction from left to right than in the opposite direction. Consequently, the shape and positions of these two surfaces of the washer cooperate to prevent the travel of lubricant along the bearing race in a direction away from the bearing.

The other washer 12 offers additional resistance to the movement of lubricant in the direction just named and thus cooperates with the washer 10 to effect the desired results.

The construction shown in Figs. 2 and 4 is like that illustrated in Figs. 1 and 3 except that the flat leaf springs 16 and 17 have been replaced with circular coiled springs 18 and 19, respectively. This device operates exactly like that above described.

A similar arrangement also is shown in Figs. 6 and 7 which differs from that illustrated in Figs. 1 and 3 simply in that the fibrous disks 10' and 12' have short radial slots formed in their edges, as shown at 20, to receive the lugs 14 of the central casing ring 9. These slots perform the same functions as the grooves 15 in preventing the rotation of the washers relatively to the casing.

In some cases a single washer only is required, and a construction suitable for this purpose is illustrated in Fig. 8. In this arrangement the ring 8 of the casing is exactly like that shown in the other figures, but the cooperating casing member 7 is replaced by a ring 7' which is provided with lugs 14' to enter the grooves 15 in the washer 10.

It will readily be appreciated that the casing parts can all be made cheaply from sheet metal by means of suitable punches and dies, and that the assembling operations are quickly performed so that the manufacturing expense of the entire article is held within satisfactory limits. The device is easily installed and can be conveniently removed and replaced when necessary.

While I have herein shown and described a preferred embodiment of my invention, it will be understood that the invention may be embodied in other forms without departing from the spirit or scope thereof.

Having thus described my invention, what I desire to claim as new is:

A grease retainer for bearings comprising an annular casing, two annular fibrous washers mounted in said casing, said washers having flat walls bearing against the outer walls of said casing, whereby the casing affords lateral support for said washers adjacent to the inner edges of the washers, the inner margins of said washers adjacent to each other being bevelled to provide thin inner edges thereon for engagement with the shaft on which the device is to be used, springs acting on the outer edges of said washers to contract them radially, a partition separating said washers, and lugs on said partition entering recesses in said washers to prevent the washers from revolving relatively to the casing.

EDWARD P. TRAVIS.